UNITED STATES PATENT OFFICE.

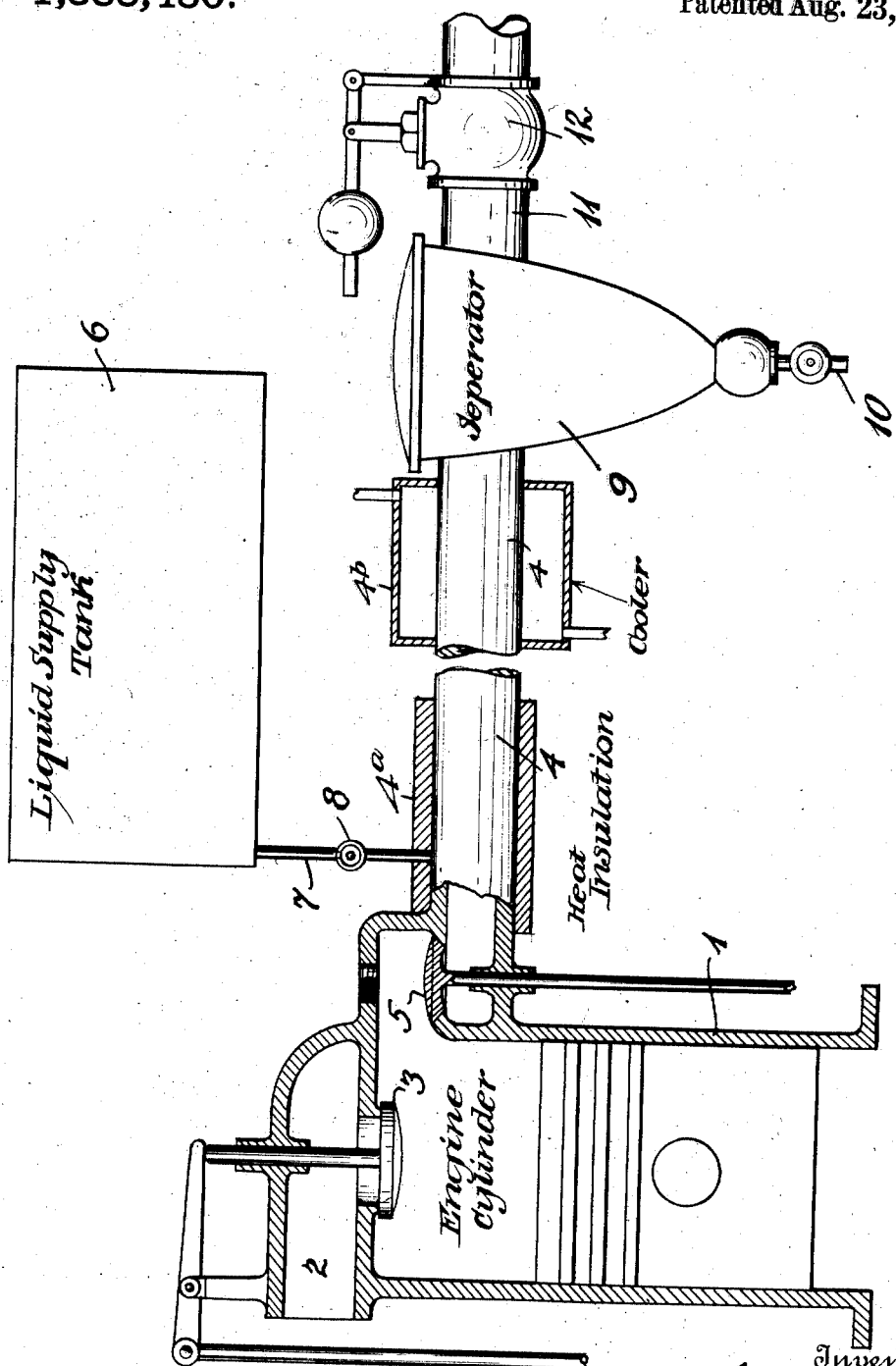

AUGUSTE JEAN PARIS, JR., OF CHARLESTON, WEST VIRGINIA.

ART OF SEPARATING USEFUL PRODUCTS FROM THE EXHAUST OF INTERNAL-COMBUSTION ENGINES.

1,388,480.     Specification of Letters Patent.     Patented Aug. 23, 1921.

Application filed April 12, 1919. Serial No. 289,767.

*To all whom it may concern:*

Be it known that I, AUGUSTE JEAN PARIS, Jr., a citizen of the United States, residing in Charleston, county of Kanawha, and State of West Virginia, have invented certain new and useful Improvements in the Art of Separating Useful Products from the Exhaust of Internal-Combustion Engines, of which the following is a specification.

This invention relates to the art of separating useful products from the exhaust of internal combustion engines, and the objects of the invention, speaking generally, are, first, to cool said exhaust by introducing therein some agent, other than water, and, second, to separate and recover useful products produced from both said exhaust and the agent thus introduced, or from a combination of the two sources.

It is the customary practice in internal combustion engine plants, particularly in large units, to cool the engine exhaust by either the direct injection of water or by water jacketing the exhaust exits, for the purpose of so reducing the temperature of such exhaust as to insure against fire.

The present invention, in contradistinction, embodies the introduction into the exhaust gases of a heat absorbing agent having less specific heat than water, with the object of not only cooling said exhaust products to the desired degree, but, in addition, utilizing such heat to increase the yield of useful products recoverable therefrom.

Among the agents which it is preferred to introduce in, or commingle with, the specified exhaust gases, by injection or otherwise, and which it may be desired to crack, polymerize, or otherwise alter, may be mentioned gaseous or liquid hydrocarbons, such as petroleum, or its distillates, natural gas, oil gas, or other suitable hydrocarbon liquid or gas, or any combination of said agents. Useful cracked products from hydrocarbons are obtained, and applicant has demonstrated, also, that the process results in the formation of small quantities of acetic acid, ammonia, ethyl and methyl alcohol, though not in large quantities, and that some of the hydrocarbons become acetated.

Features of the invention other than those specified will be apparent from the hereinafter detailed description taken in conjunction with the accompanying drawings.

The drawings show, diagrammatically, one form of apparatus in which the process may be practised, although, it will be understood, that this form is typical only, and not exclusive of the various embodiments of apparatus which may be employed in practising the process.

Referring to the drawings, 1 designates an internal combustion engine having an inlet 2, controlled by a valve 3, and an exhaust 4, controlled by a valve 5. A tank 6 designates, generically, the source of the heat absorbing agent, which, for the purposes of the present illustration of the process, may be considered as containing a suitable hydrocarbon liquid. Leading from tank 6 is a pipe 7, provided with a valve 8, for the purpose of introducing the heat absorbing agent into the exhaust 4 from the engine. The exhaust 4, for purposes of illustration, is shown in the form of a pipe, although, it will be understood, that it might partake of any other suitable form. While not necessary for practical operation, the efficiency of the apparatus may be enhanced by providing a heat insulating jacket $4^a$ on the exhaust, for some distance beyond the valve 5, and a cooling jacket $4^b$, or other cooling means, between the insulated section and a separator positioned in the exhaust, designated 9, whereby a relatively high temperature is maintained in the first section of the exhaust, and a relatively low temperature in the section following. Separator 9 may be of any well known type, the function of which is to separate from the gaseous mixture, passing through the exhaust, some or all of the useful products desired. The products accumulating in the separator may be drawn off, as occasion requires, through the valve pipe 10. That portion of the exhaust 11, positioned beyond the separator, is preferably provided with a balanced valve 12 for maintaining a slight pressure, say of from one half to one pound in the system, but not sufficiently high to interfere, through back pressure with the operation of the engine. It will be understood that other well known ways might be employed to bring about this specified pressure in the system. Moreover, other means, than those specified, might be employed to effect the separation of the useful constituents desired, either in whole or part, such as refrigeration, compression, and cooling under pressure. Moreover, one of the last mentioned methods may be employed in conjunction with the separator 9. One method of separation which, in particular, I have found practical is a compression of the gases or vapors followed by cooling, i. e., condensation of the liquefiable products. The residuary gases, after being subjected to the separating process or processes, may be utilized for any desired purpose, or allowed to escape into the atmosphere.

From the foregoing description, the operation of the apparatus will be readily understood, but may be described, briefly, as follows. As the combusted gases from the engine enter the exhaust 4 there is introduced therein, and commingled therewith, the heat absorbing agent, such as liquid hydrocarbon, through the pipe 7. The thus introduced admixture passes to the separator 9, wherein the useful products, in whole or in part, are separated and recovered, the residuary product being subsequently manipulated as desired, or allowed to escape into the atmosphere. Practical tests show that for every fifty feet of gas burned in the engine, or its equivalent in a carbureted mixture, or an equivalent amount of other fuel, substantially a gallon of the hydrocarbon heat absorbing agent, such as kerosene or its equivalent in vapor or gas, may be introduced into the exhaust gases, although advantageous results have been obtained by using very materially greater or very materially lesser quantities of such agents. In cracking kerosene, a temperature of 700° F., or slightly above, as is well known, may be employed. So far as proportions are concerned, I have advantageously used in the gas engine, fifty feet of natural gas mixed with five hundred feet of air and injected into the exhaust one gallon of kerosene. The temperature of the exhaust being upward of 700° F., which cracked the kerosene in whole or in part, and the liquefiable products were separated out therefrom by liquefaction. These products consist of water, acid, probably acetic acid, cracked hydrocarbons and residuary hydrocarbons.

Various modifications may be made to the specific process described without departing from the spirit or substance of the invention, the scope of which is commensurate with the appended claims. For example, the heat absorbing agent may be heated, to a more or less extent, prior to its introduction into the exhaust gases, in which event a larger quantity of the heat absorbing agent may be employed, or instead of employing the exhaust gases from an internal combustion engine, gases of similar or analogous characteristics may be produced in various other ways, or obtained from various other sources. For example, if a complete combustion of the gases is not desired, the combustion may be restricted so as to produce carbon monoxid instead of carbonic dioxid as is ordinarily desired. Moreover, the extent and character of the combustion in the engine cylinder might be controlled by mixing aqueous or other vapor with the intake products, or by effecting the combustion, in whole or in part, by oxygen instead of air. For example, if oxygen is used instead of air, a quicker and more thorough combustion can be effected and without necessitating the introduction of nitrogen.

Having thus fully described the invention, what I claim as new, and desire to secure by Letters Patent is:

1. In the art specified, the process which consists in absorbing the heat from products of combustion from an internal explosive engine by introducing therein a suitable heat absorbing agent other than water, and thereafter condensing and separating out the liquefiable products.

2. In the art specified, the process which consists in absorbing the heat from products of combustion from an internal explosive engine by introducing therein a liquid other than water, and thereafter condensing and separating out the liquefiable products.

3. In the art specified, the process which consists in absorbing the heat from products of combustion from an internal explosive engine by introducing therein a liquid hydrocarbon, and thereafter condensing and separating out the liquefiable products.

4. In the art specified, the process which consists in absorbing the heat from products of combustion from an internal explosive engine by introducing therein a liquid other than water, and thereafter separating out and recovering useful products, and thereafter condensing and separating out the liquefiable products.

5. In the art specified, the process which consists in absorbing the heat from products of combustion from an internal explosive engine by introducing therein petroleum or its distillates, and thereafter condensing and separating out the liquefiable products.

6. In the art specified, the process which consists in absorbing the heat from products of combustion from an internal explosive engine by introducing therein petroleum or its distillates, and thereafter separating out and recovering useful products, and thereafter condensing and separating out the liquefiable products.

7. In the art specified, the process which consists in commingling with the exhaust products of an internal combustion engine a suitable heat absorbing agent, other than water, and thereafter condensing and separating out the liquefiable products.

8. In the art specified, the process which consists in commingling with the exhaust products of an internal combustion engine a suitable hydrocarbon, and thereafter separating out and recovering the resulting useful products.

In testimony whereof I have signed my name to this specification.

AUGUSTE JEAN PARIS, Jr.